US009838135B1

(12) United States Patent
Xu et al.

(10) Patent No.: US 9,838,135 B1
(45) Date of Patent: Dec. 5, 2017

(54) DIFFERENTIAL ELECTRO-ABSORPTION MODULATOR (EAM) DRIVER

(71) Applicant: INPHI CORPORATION, Santa Clara, CA (US)

(72) Inventors: Chao Xu, Thousand Oaks, CA (US); Radhakrishnan L. Nagarajan, Santa Clara, CA (US)

(73) Assignee: INPHI CORPORATION, Santa Clara, CA (US)

(*) Notice: Subject to any disclaimer, the term of this patent is extended or adjusted under 35 U.S.C. 154(b) by 0 days.

(21) Appl. No.: 15/061,994

(22) Filed: Mar. 4, 2016

(51) Int. Cl.
*H04B 10/25* (2013.01)
*H04B 10/516* (2013.01)
*H04B 10/50* (2013.01)

(52) U.S. Cl.
CPC ........ *H04B 10/516* (2013.01); *H04B 10/503* (2013.01)

(58) Field of Classification Search
CPC ................ G02F 1/0121; G02F 1/025; G02F 2001/0157; G02F 2001/212; G02F 1/2257; G02F 1/225; G02F 2201/127; H04B 10/505
USPC ........................................................ 398/183
See application file for complete search history.

(56) References Cited

U.S. PATENT DOCUMENTS

| 9,006,740 B1 | 4/2015 | Nagarajan |
| 9,166,704 B1 | 10/2015 | Nagarajan |
| 9,438,970 B2* | 9/2016 | Jones ................. G02B 6/12019 |
| 2009/0087196 A1* | 4/2009 | Welch ................. H04L 25/0272 398/183 |
| 2014/0233083 A1* | 8/2014 | Tatsumi ................ G02F 1/0121 359/245 |
| 2016/0139485 A1* | 5/2016 | Winzer ................ G02F 1/2255 385/3 |

OTHER PUBLICATIONS

Pei-Cheng Ku, "Electro-absorption Modulators", EE232 Spring 2001, Apr. 24 & 26, 2001, pp. 1-57.

\* cited by examiner

*Primary Examiner* — Don N Vo
(74) *Attorney, Agent, or Firm* — Richard T. Ogawa; Ogawa P.C.

(57) ABSTRACT

Embodiments are directed to a driver circuit for an electro-absorption modulator (EAM). Particular embodiments may employ a single differential electrical driver supplying complementary positive and negative voltage signals to two respective EAMs. DC bias for the EAMs is provided at a common node in the middle. An optical source is split and fed to each of the EAMs. The EAM receiving the positive voltage signal functions to communicate the optical data as output. The other EAM receiving the negative voltage is a dummy device providing a balance load for the differential driver circuit. Signal swing is determined by a termination resistor $R_t$ located between parallel rails of the differential driver circuit. EAM properties such as swing and signal integrity can be traded off by choosing a different value for the termination resistor. In certain embodiments, the optical output of the dummy EAM may be used for device monitoring purposes.

20 Claims, 12 Drawing Sheets

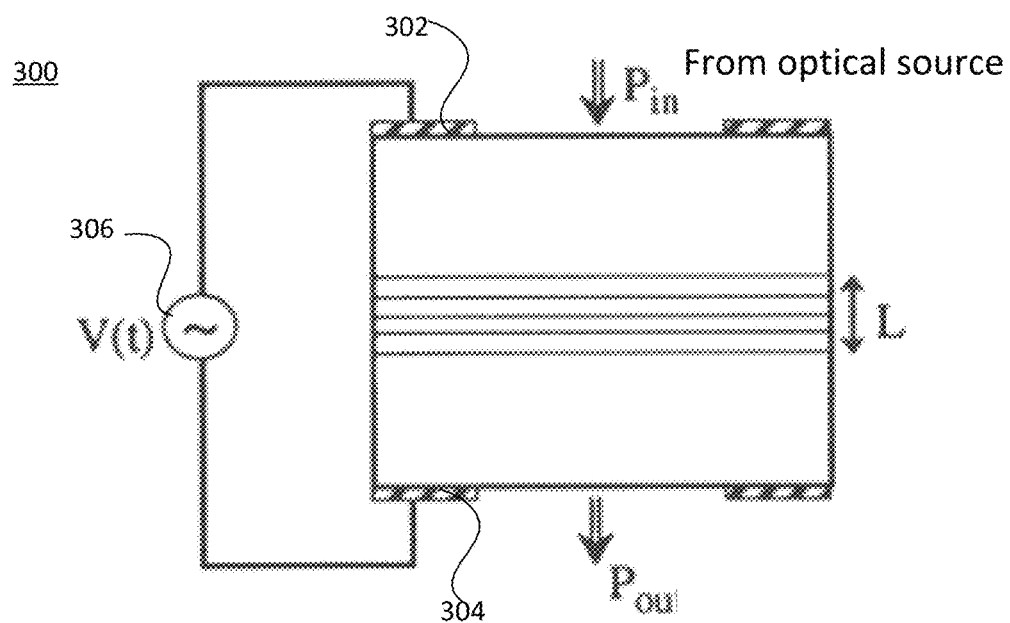
FIG. 3A
FIG. 3B
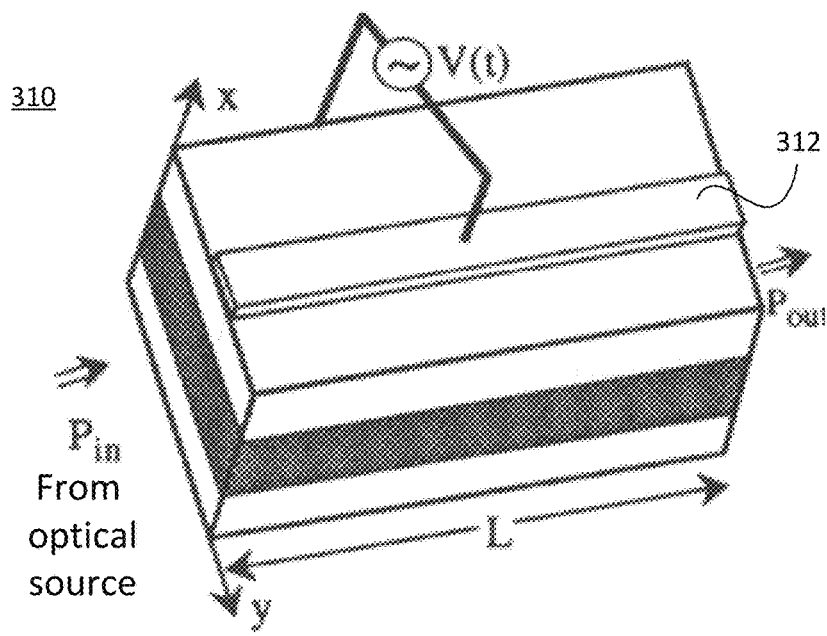

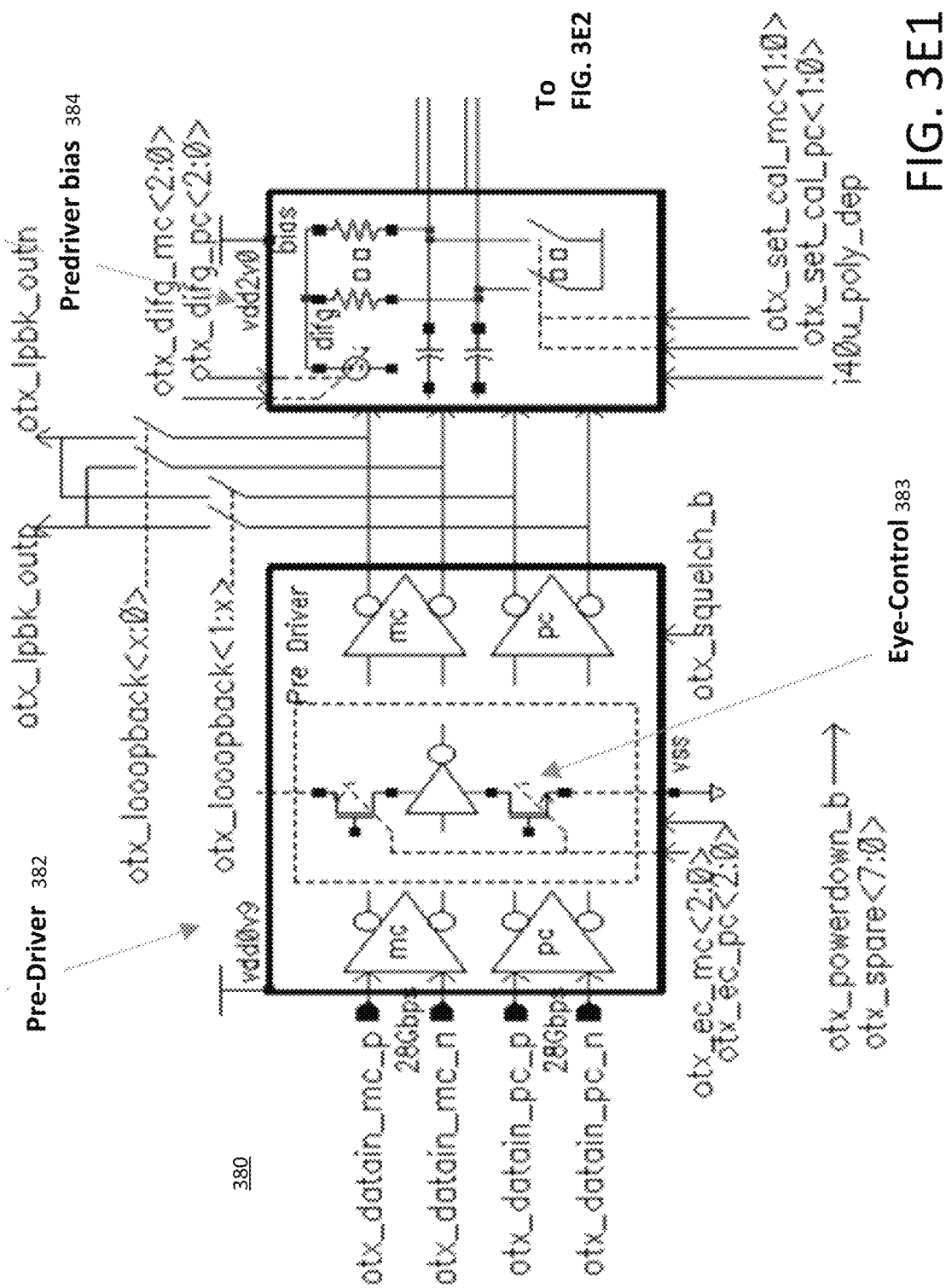
FIG. 3E1

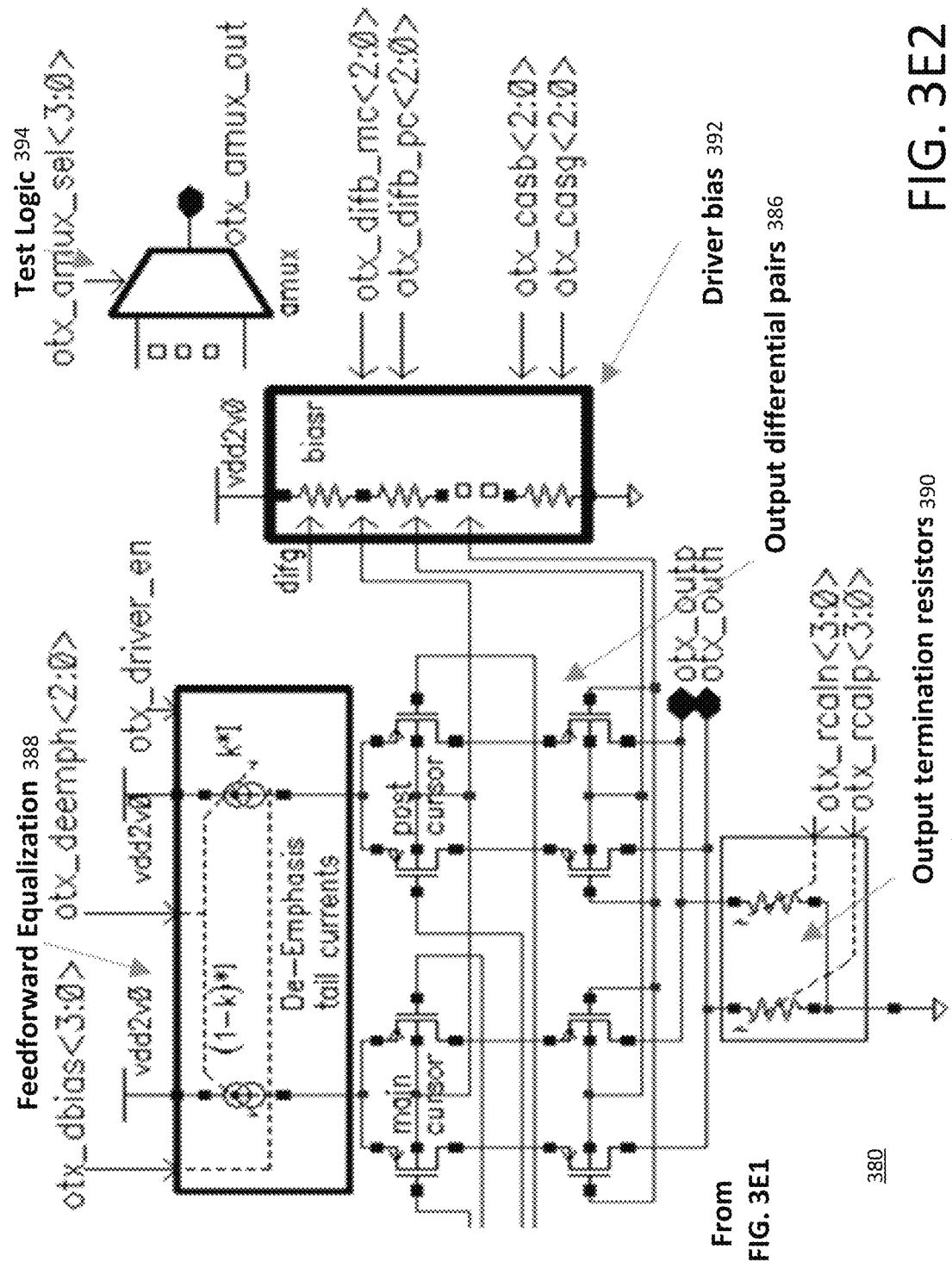
FIG. 3E2

DIFFERENTIAL ELECTRO-ABSORPTION MODULATOR (EAM) DRIVER

BACKGROUND

Embodiments are directed to an electro-optical component, and in particular to a differential electro-ab sorption driver.

The electro-absorption modulator (EAM) is a photonics component which can be used for modulating the intensity of a laser beam via an electric voltage. Its principle of operation is based on the Franz-Keldysh effect, i.e., a change in the absorption spectrum caused by an applied electric field, which changes the bandgap energy (thus the photon energy of an absorption edge) but usually does not involve the excitation of carriers by the electric field.

For modulators in telecommunications small size and modulation voltages are desired. The EAM is candidate for use in external modulation links in telecommunications.

The EAM driver provides a voltage waveform to modulate the EAM device based upon the data that is to be sent. Due to operating parameters of telecommunications applications, the EAM driver needs to have high bandwidth and provide large voltage swing to drive the EAM device. It is a challenge to design an EAM driver circuit to provide enough signal swing on a low voltage supply and also run at high data rate (such as 28 Gbps speed).

Accordingly there is a need in the art for improved designs of EAM drivers.

SUMMARY

Embodiments are directed to a driver circuit for an electro-absorption modulator (EAM). Particular embodiments may employ a single differential electrical driver supplying complementary positive and negative voltage signals to two respective EAMs. DC bias for the EAMs is provided at a common node in the middle. An optical source is split and fed to each of the EAMs. The EAM receiving the positive voltage signal functions to communicate the optical data as output. The other EAM receiving the negative voltage is a dummy device providing a balance load for the differential driver circuit. Signal swing is determined by a termination resistor $R_t$ located between parallel rails of the differential driver circuit. EAM properties such as swing and signal integrity can be traded off by choosing a different value for the termination resistor. In certain embodiments, the optical output of the dummy EAM may be used for purposes of monitoring the device. There are other embodiments as well. According to some embodiments, the dummy EAM device can be replaced with a resistor instead.

An apparatus according to an embodiment comprises an optical splitter configured to produce a first optical input and a second optical input from an optical source. A differential driver circuit is configured to produce a positive voltage and a negative voltage complementary to the first positive voltage. A first electro-absorption modulator is configured to receive the positive voltage and the first optical signal to produce an optical data signal. A second electro-absorption modulator is configured to receive the negative voltage and the second optical signal to produce a dummy optical signal, providing a balance load to the differential driver.

A method according to an embodiment comprises splitting an optical signal from an optical source to provide a first optical input and a second optical input. A differential driver circuit produces a positive voltage and a negative voltage complementary to the first positive voltage. A first electro-absorption modulator produces a first optical data signal in response to the positive voltage and the first optical signal. A second electro-absorption modulator produces a dummy optical signal in response to the negative voltage and the second optical signal. The second electro-absorption modulator provides a balance load to the differential driver circuit.

BRIEF DESCRIPTION OF THE DRAWINGS

FIGS. 3A-B show simplified views illustrating different EAM types.

FIGS. 3E1-3E2 show a specific example of one differential driver circuit according to an embodiment.

DETAILED DESCRIPTION

Embodiments are directed to apparatuses and methods of providing EAM drivers. More specifically, particular embodiments provide differential electro-absorption modulator (EAM) drivers. There are other embodiments as well.

An electro-absorption modulator can be realized using either bulk semiconductor materials or materials with multiple quantum dots or wells. EAMs may be made in the form of a waveguide with electrodes for applying an electric field in a direction perpendicular to the modulated light beam. For achieving a high extinction ratio, the Quantum-confined Stark effect (QCSE) in a quantum well structure may be exploited.

The EAM driver may be an integrated device providing a voltage waveform to modulate the EAM device to communicate the data. Data to be sent in different modulation formats, such as non-return-to-zero (NRZ), Pulse Amplitude Modulation (PAM) etc.

The EAM and its driver according to embodiments, may be packaged in an integrated multiple chip module (MCM) as a single system-on-a-chip (SOC). This MCM module transceiver may be used as a high bandwidth, board-mounted optical transceiver leveraging advanced silicon photonics technology to provide multiple use cases and product platforms.

Figure 1:
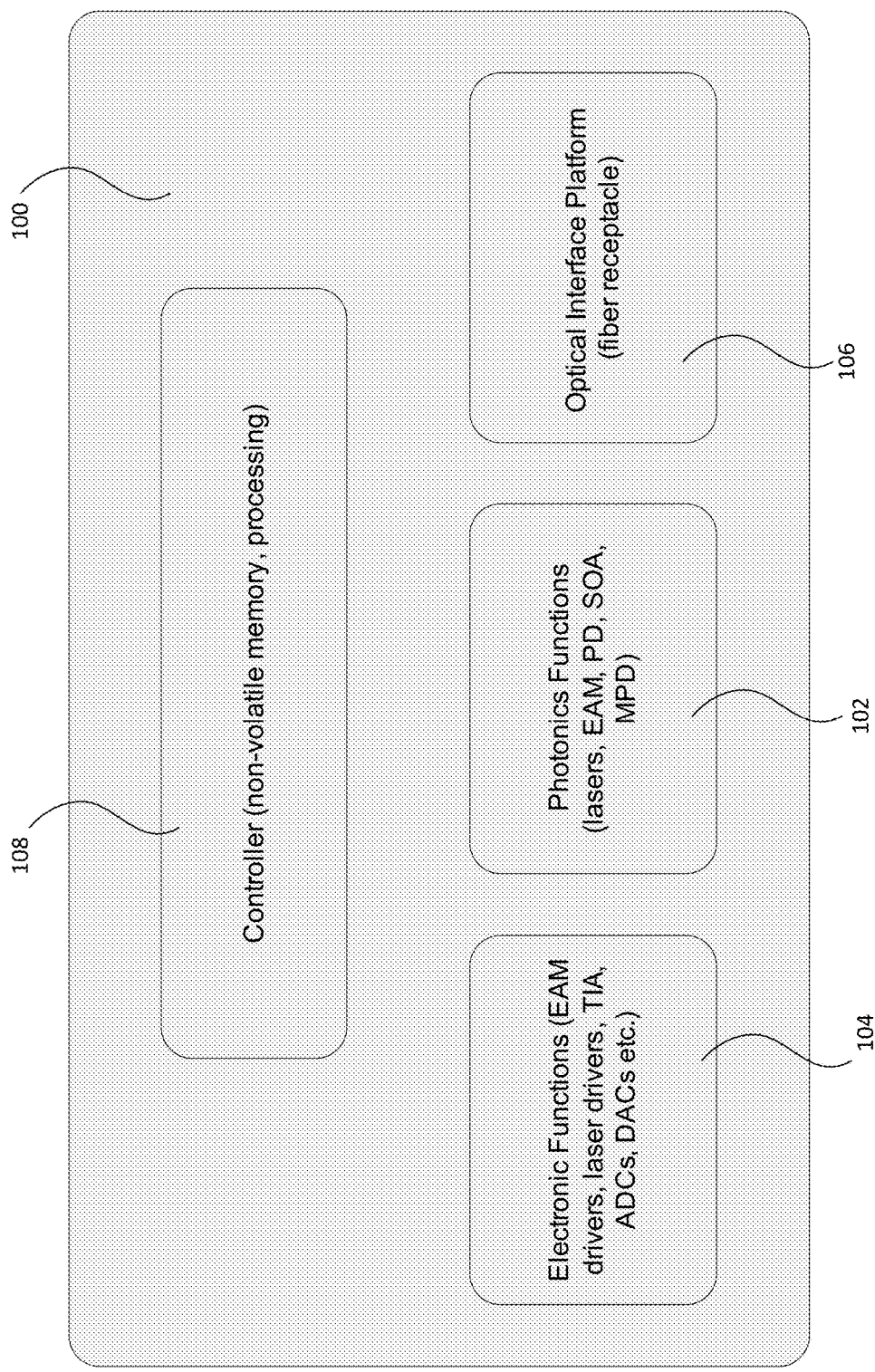
FIG. 1 illustrates a simplified block diagram of one example of a multi-chip module according to an embodiment.

FIG. 1 illustrates a simplified block diagram of one example of MCM 100 according to an embodiment. A Photonic Functions block 102 is based on silicon photonics technology that provides generation, modulation, monitoring, detection, multiplexing, demultiplexing, and routing of light. Here, PD refers to Photo Detector, SOA refers to Semiconductor Optical Amplifier, and MPD refers to Monitor Photo Diode.

An Electronic Functions block 104 provides host electrical interfaces and interfaces to the Photonic Functions block. Here, TIA refers to transimpedance amplifier, ADC refers to analog-to-digital converter, and DAC refers to digital-to-analog converter.

A single detachable Optical Interface Platform (OIP) 106 couples light to and from the Photonic Functions block from and to single mode fiber or fibers. A controller 108 provides non-volatile memory and the processing required to monitor and control the Electronic and Photonic Functions.

Conventional EAM drivers may employ a single-ended design. That means the driver usually provides a single-ended voltage to one terminal of EAM device. The other terminal of the conventional EAM device is connected to a DC bias voltage.

Certain single-ended driver designs may provide the DC bias voltage through a bias-tee structure which includes an inductor from Vbias to the top terminal of EAM device. This approach, however, may require a large inductor to separate the RF signal from DC bias. It may be difficult to integrate this large value inductor with the EAM itself.

Other single-ended EAM driver designs may remove a bulky inductor and have two drivers. A top driver is a DC voltage driver which only provides the DC bias voltage. A RF driver at the bottom drives the RF data to the bottom terminal of EAM. So, the RF signal is still susceptible to noise sources and system performance is limited.

Figure 2:
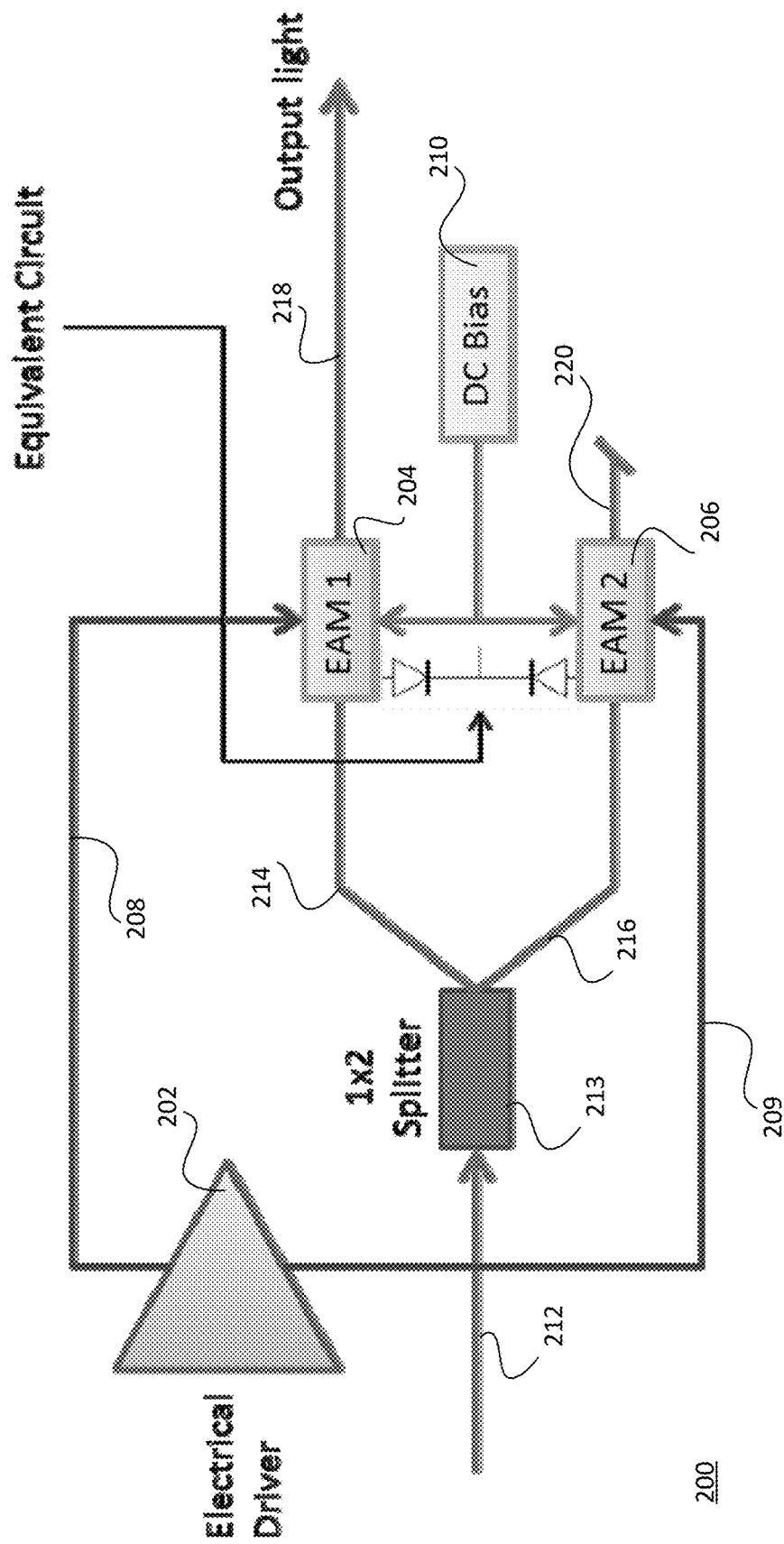
FIG. 2 illustrates a differential driver design according to an embodiment.

Accordingly, in order to reduce the impact of noise, particular embodiments propose a differential driver design providing two complementary RF signals to the EAM device. FIG. 2 shows a simplified view of a differential driver design according to one embodiment.

In the system 200 of FIG. 2, one differential electrical driver 202 generates fully differential signals to two EAM devices 204, 206. The positive signal 208 drives the top EAM1 204, and the negative signal 209 drives the bottom EAM2 206.

The DC bias for these two EAMs is provided at the common node 210 in the middle.

The optical signal 212 is split by splitter 213 into two paths. One path 214 goes to the top EAM1, the other path 216 goes to the bottom EAM2.

The light 218 output from the top EAM1 is used in normal operation. The bottom EAM2 is a dummy device. That dummy device provides a balance load for the differential driver.

The light 220 output of EAM2 may not be used for data communication, but can be employed for other purposes. For example, the EAM2 output can be used as a monitor of the optical output.

FIGS. 3A-3B provide details regarding EAM structure and operation. In general, the EAM is a semiconductor device with a similar structure as a laser diode. In laser diodes, enough current is injected to achieve stimulated emission. In an EAM, electric field (reverse bias) is applied to change the absorption spectrum. While carriers are not injected into the active region, carriers are generated due to absorption of light.

FIG. 3A shows a simplified view of a transverse transmission modulator 300. In this EAM type, electrodes 302, 304 receiving voltage from the single-ended driver 306 are oriented transverse to the planar structure (e.g., made from specific III-IV compound material). The input waveguide (Pin) receives the incident light from the optical source, and the light is modulated by the electrical voltage applied by going through the EAM device and the modulated light is transmitted to the output waveguide (Pout).

FIG. 3B shows a simplified view of another EAM type—the waveguide modulator 310. In this EAM type, electrodes 312 receiving voltage from the single-ended driver are oriented on the top and bottom planes while the light is inputted from one side (Pin) and emitting out from the other side (Pout).

Figure 3C:
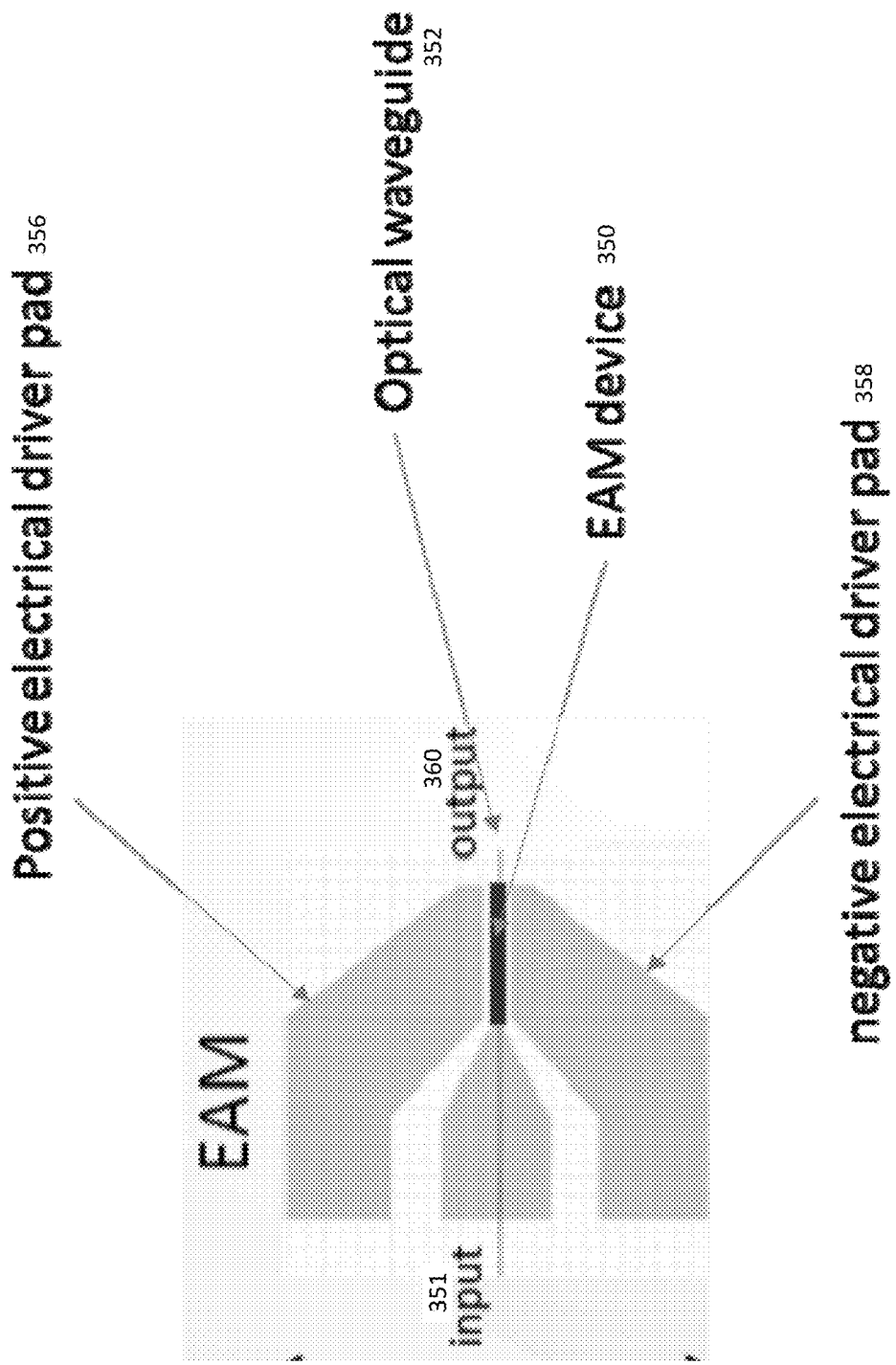
FIG. 3C shows an interface between a differential driver circuit and an EAM.

FIG. 3C shows one of the two EAM devices of FIG. 2 in the interface between an EAM and the electrical source of a differential driver circuit. In particular, the generic EAM 350 receives optical signal input 351 from optical source, on waveguide 352.

In order to use differential driver topology, two EAM devices are employed. A differential driver positive output is connected to the positive pad 356 of the top EAM. The top EAM negative pad 358 is connected to the bottom EAM positive pad. This common node is connected to a DC Bias. The bottom EAM negative pad is connected to the negative output of the differential driver. In response to receiving these voltages, the EAM produces corresponding optical output 360.

In certain embodiments, operation of the EAM may result in one or more of the following features:
low/negative chirp;
high speed (e.g., 28 Gbps);
reduced polarization dependence;
integration with laser (optical source);
low required drive voltage (e.g., 1V peak to peak swing);
reduced DC bias voltage (e.g., 3.3V);
small size (e.g., 500 um×400 um).

Figure 3D:
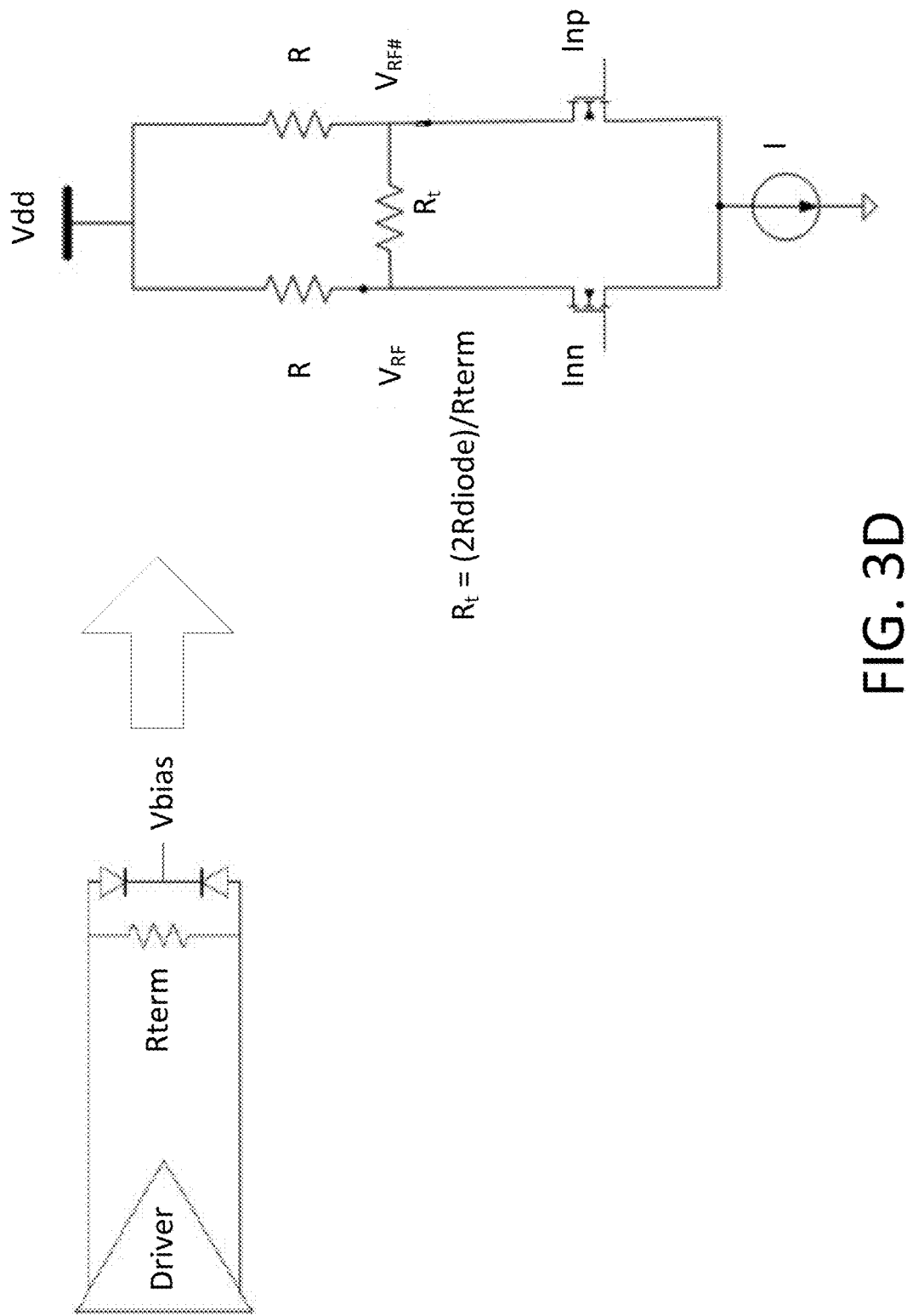
FIG. 3D is a simplified view of the corresponding differential driver circuit of the embodiment of FIG. 2.

FIG. 3D is a simplified view of the corresponding equivalent differential driver circuit. Here, the $R_t$ on the right hand side of the figure is an equivalent resistor of the load on the left hand side of FIG. 3D. Rterm is in parallel with two back-to-back EAM diodes. The EAM diode is modeled as a resistor Rdiode.

The circuit is used to calculate the different driver output signal swing, common mode voltage, and reversed bias voltage on each EAM diode. The exact topology of the driver can deviate from the specific embodiment of FIG. 3D, as long as it provides a complementary differential outputs.

The differential outputs of the driver may be routed in close proximity so that they reference to each other. Thus, noise will affect both positive and negative voltage equally. The differential signal is not affected due to the noise is cancelled.

FIGS. 3E1-3E2 show a specific example of an embodiment of a differential driver circuit. Here, the EAM differential driver circuit structure 380 comprises a pre-driver 382.

The Main-Cursor (MC) and Post-Cursor (PC) data builds up drive strength to drive their respective diff pairs through the pre-driver. Eye control 383 will be embedded in this path, per the block diagram.

In the predriver bias block 384, the pre-driver output is AC coupled into the diff pair output stage through DC block caps. Diff pair gates are pulled up to a common mode bias voltage difg_mc and difg_pc, through large value resistors >200 kohms to set lower corner freq <100 kHz.

The output Diff Pairs 386 are loaded with ~56 ohms source termination resistors in series with ~300 pH peaking inductor to compensate for the parasitic loading of the RF pads, routing and ESD diodes. The diff pair output is powered by the vddlv8 supply (@ 2.0V)

In the FeedForward equalization block 388, one tail current biases up the MC diff pair, and one tail current biases up the PC diff pair. The sum of the MC and PC tail currents is constant. When PC diff pair tail current increases, the MC diff pair tail current decreases by the same amount, through ratiometric matching. By adjusting the ratio of MC tail current to PC tail current, de-emphasis is achieved.

For the output termination resistors 390, the MC/PC diff pair output currents are summed into the ~56 ohms source termination resistors, and the output is tapped at this junction. The 56 ohms source termination resistor is trimmable digitally. With MC/PC diff pair turned off, external current sinks otx_voutp/otx_voutn sequentially, and on chip Kelvin sense on otx_voutp/otx_voutn node will be tapped out through an analog mux.

FIG. 3E2 further shows the driver bias 392 which generates various bias voltage for the driver stage circuit. Test logic 394 provides the test path in the driver circuit.

Figure 4:
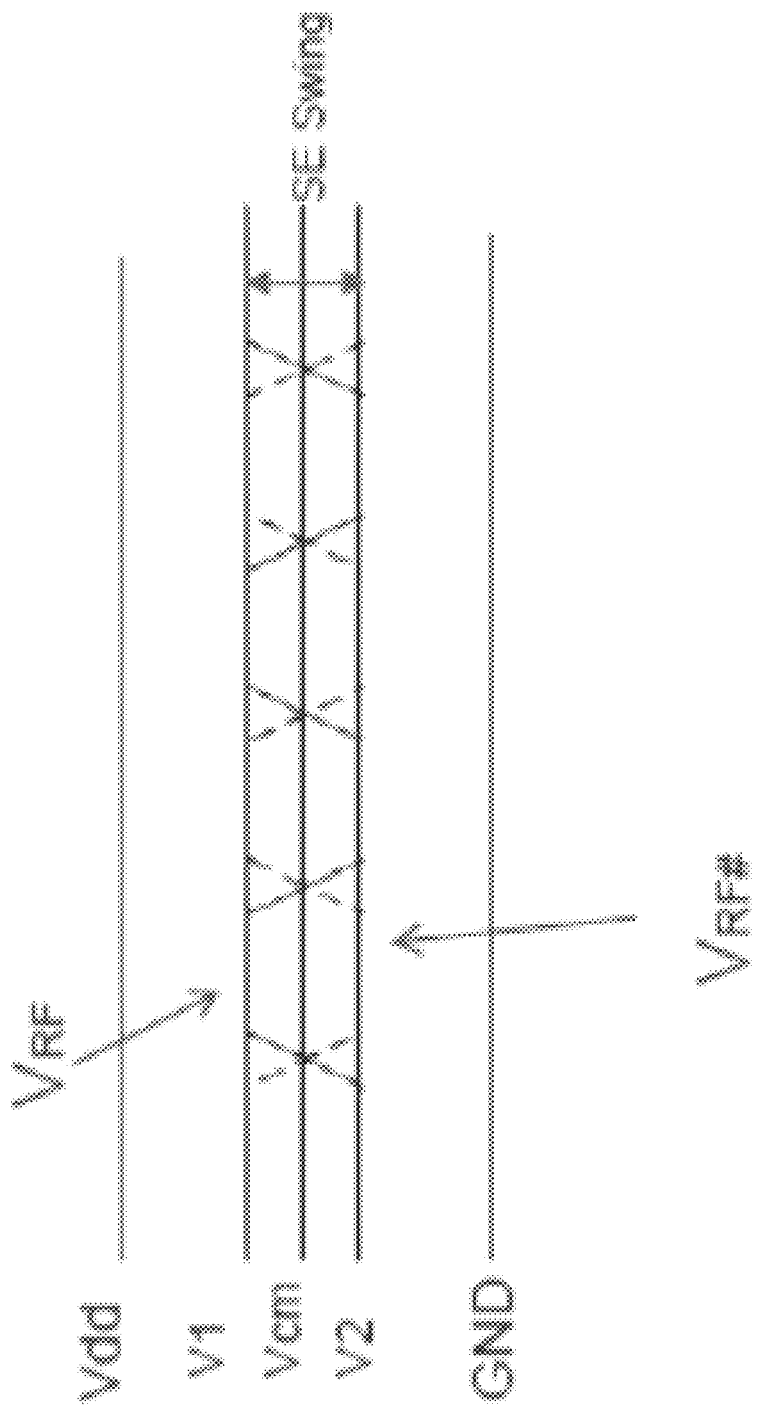
FIG. 4 shows the differential voltage of $V_{RF}$ and $V_{RF\#}$ in an embodiment.

FIG. 4 shows general operation of driver to produce the differential voltage of $V_{RF}$ and $V_{RF\#}$. The following calculation shows that both $V_{RF}$ and $V_{RF\#}$ swing between V1 and V2. The common mode is $V_{CM}$.

$$V1 = Vdd - \frac{R^2}{2R + R_t} * I$$

$$V2 = Vdd - \frac{(R + R_t)R}{2R + R_t} * I$$

$$Vcm = (V1 + V2)/2 = Vdd - \frac{2R^2 + R * R_t}{2(2R + R_t)} * I$$

$$SESwing = V1 - V2 = \frac{R * R_t}{2R + R_t} * I$$

The signal swing is determined by the termination resistor resistance $R_t$. Swing and signal integrity can be traded off by choosing a different value for the termination resistance.

Example 1—Ideal Termination

Figure 5:
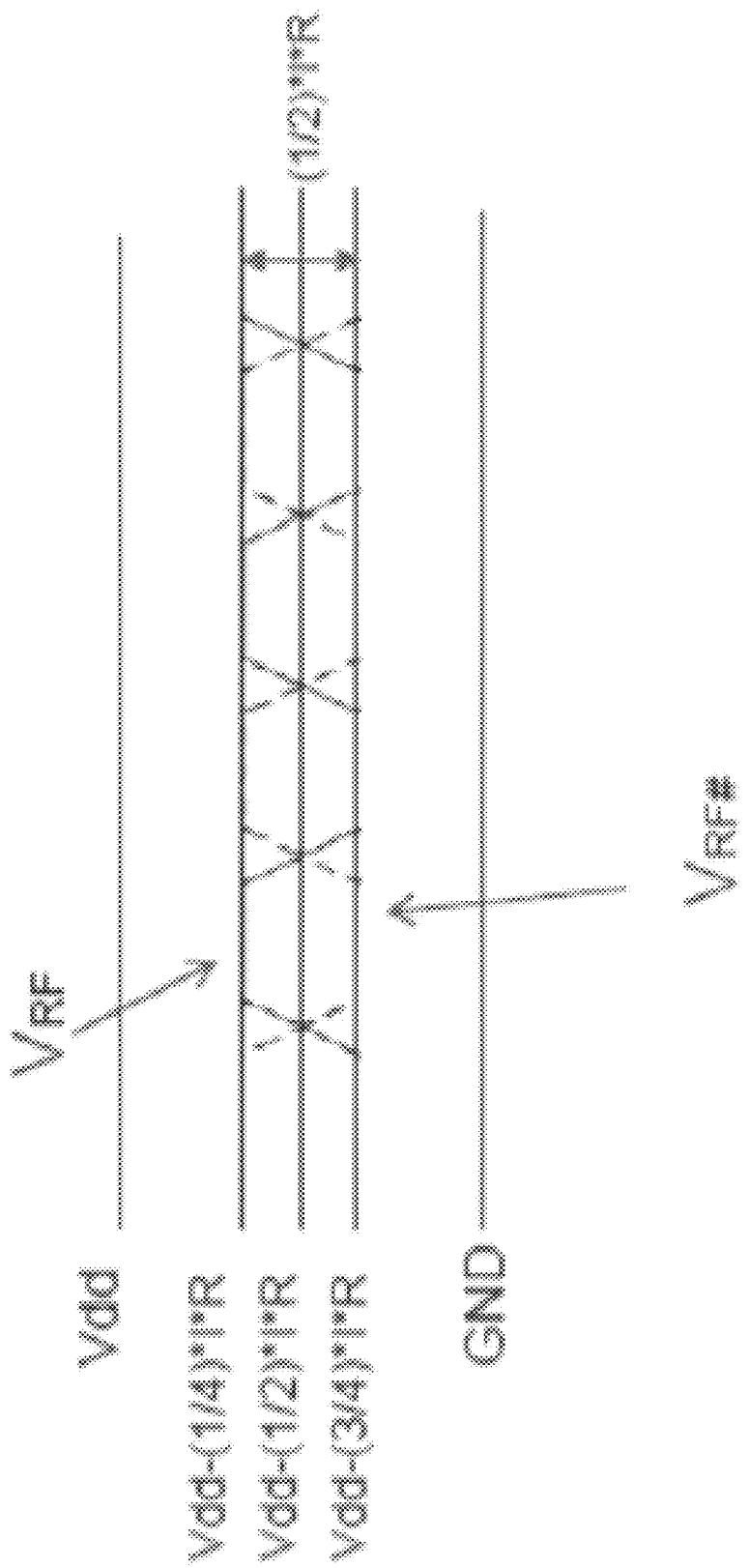
FIG. 5 shows the swing and common mode under conditions of a first example.

For matching to achieve ideal signal integrity performance ($R_t=2*R$), the swing and common mode calculation is provided below and shown in FIG. 5.

$$V1 = Vdd - \frac{1}{4}I * R$$

$$V2 = Vdd - \frac{3}{4}I * R$$

$$Vcm = (V1 + V2)/2 = Vdd - \frac{1}{2} * I * R$$

$$SESwing = V1 - V2 = \frac{1}{2} * I * R$$

Figure 6:
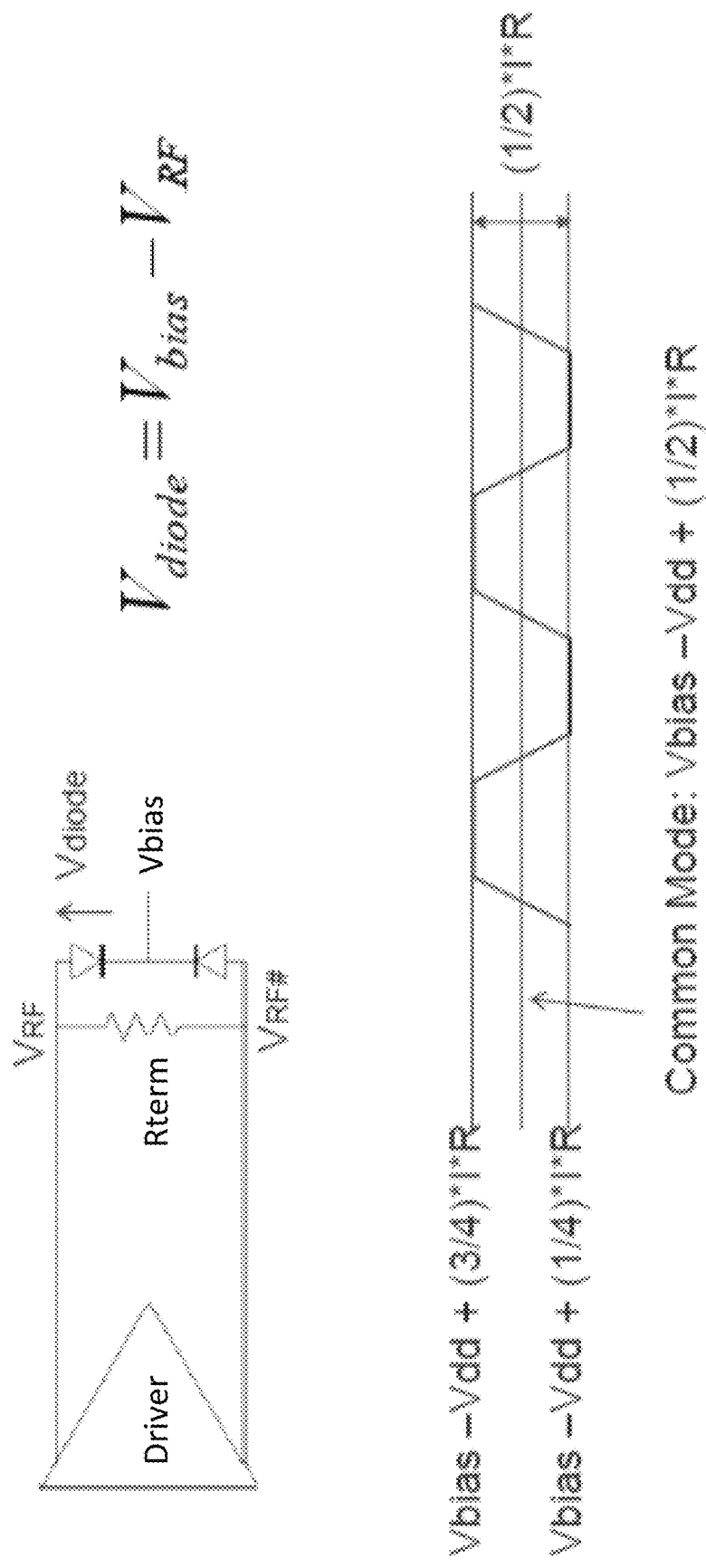
FIG. 6 shows the EAM diode reverse bias voltage calculation of the first example.

The EAM diode reverse bias voltage calculation is shown in FIG. 6.

Example 2—No Remote Termination

In a second example, there is no remote termination. $R_t$ is removed ($R_t \gg R$) in order to) save power and to provide a large swing.

Figure 7:
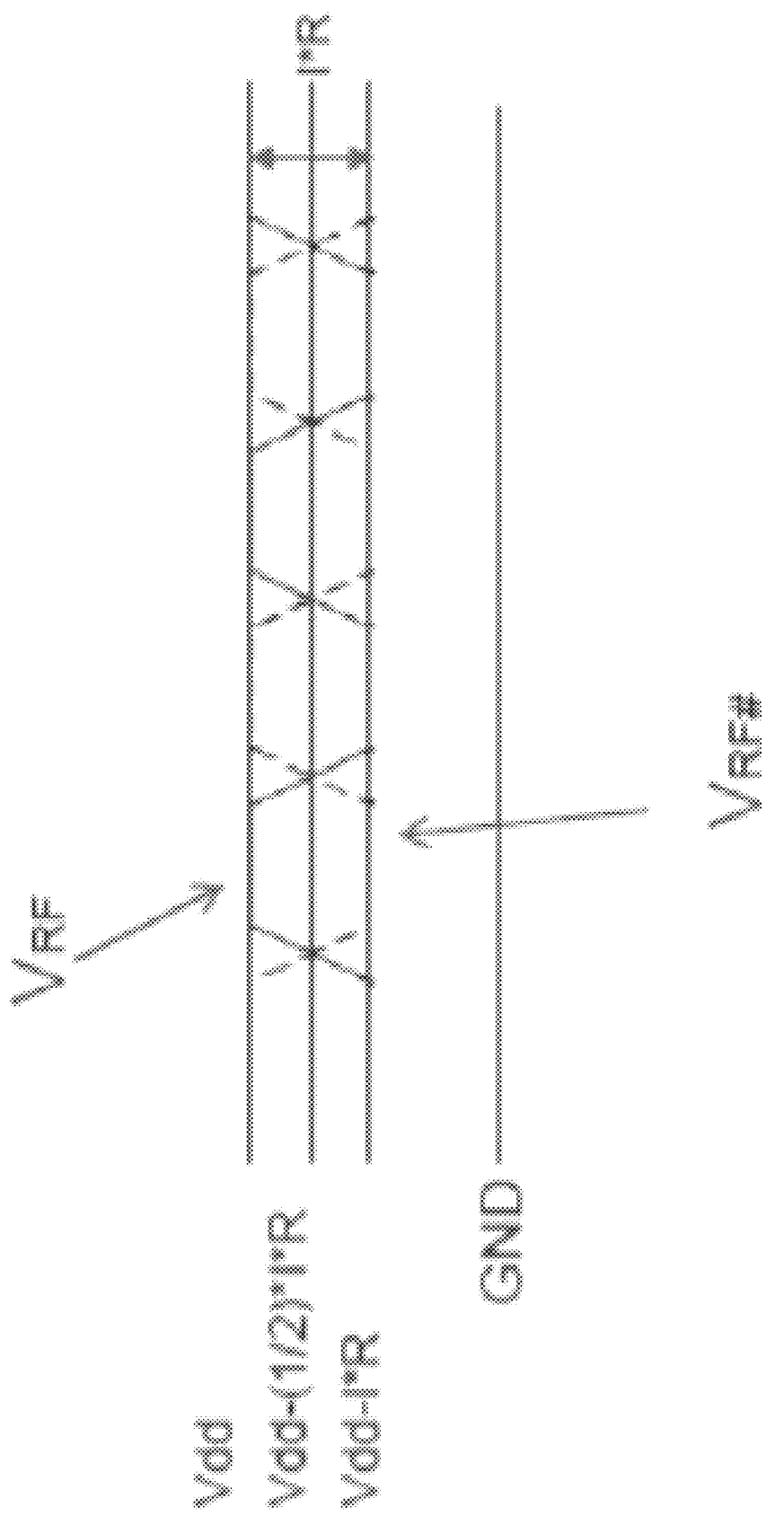
FIG. 7 shows the swing and common mode under conditions of a second example.

The swing and common mode calculation for this second example is given below and shown in FIG. 7.

$$V1 = Vdd$$

$$V2 = Vdd - I*R$$

$$Vcm = (V1 + V2)/2 = Vdd - \frac{1}{2} * I * R$$

$$SESwing = V1 - V2 = I*R$$

Figure 8:
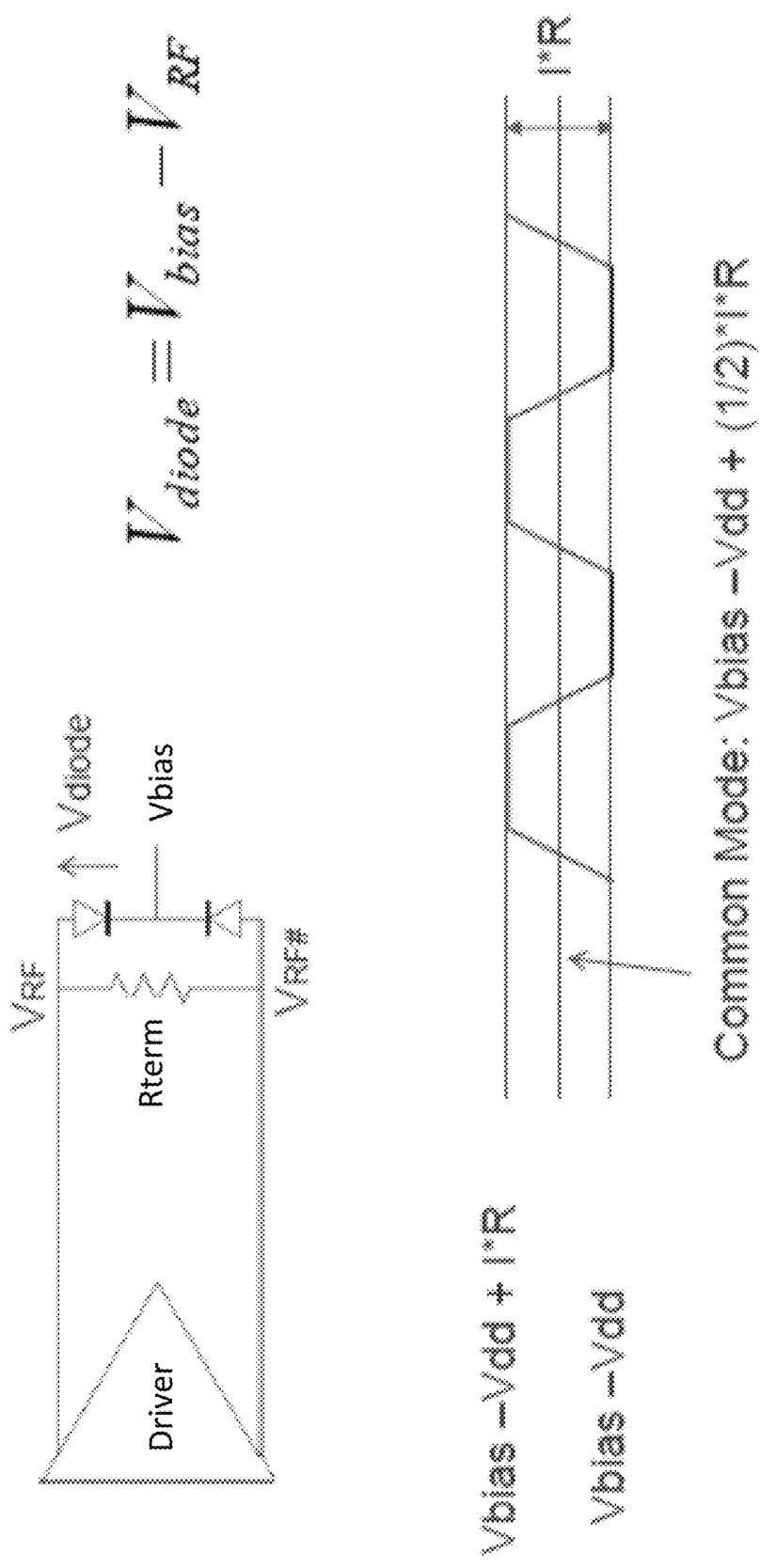
FIG. 8 shows the EAM bias voltage calculation for the second example.

The EAM bias voltage calculation for this second example is shown in FIG. 8.

It is to be appreciated that through the use of a differential EAM driver circuit) according to an embodiment, a number of possible benefits may be achieved. For example, one such benefit is performance.

In particular, as compared with an electro-optic modulator (EOM), an EAM can operate with lower voltages (e.g., a few volts instead of ten volts or more). And, EAMs can be operated at high speed. A modulation bandwidth of tens of gigahertz can be achieved, which renders these EAM devices useful for optical fiber communication.

Furthermore, the differential driver provides two complementary signals and reduces the noise impact. Hence, differential driver topology can further increase the bandwidth of system and improve the system performance.

A convenient feature is that an EAM can be integrated with distributed feedback laser diode on a single chip to form a data transmitter in the form of a photonic integrated circuit. As compared with direct modulation of the laser diode, a higher bandwidth and reduced chirp can be obtained.

Finally, use of the differential driver eliminates the need for a bulky inductor that may be associated with certain single-ended driver designs. This eases integration of the driver with the EAM itself, and reduces costs.

While the above discussion has focused upon embodiments in which a differential driver provides complementary voltages to an active EAM and a dummy EAM, this is not required. According to alternative embodiments the dummy EAM could be replaced with a resistive element instead in order to provide a balance load to the differential driver circuit.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. An apparatus comprising:
   an optical splitter configured to produce a first optical signal and a second optical signal from an optical source;
   a differential driver circuit comprising a first parallel rail and a second parallel rail between a high voltage and ground and connected by a termination resistor, the first parallel rail configured to produce a positive voltage and the second parallel rail configured to produce a negative voltage complementary to the first positive voltage;
   a first electro-absorption modulator comprising,
   a first diode comprising a first junction along a first dimension and including a waveguide receiving the first optical signal,
   a first electrode in communication with a bias voltage,
   a second electrode opposite the waveguide from the first electrode in a second dimension orthogonal to the first dimension, the second electrode configured to receive the positive voltage and apply a voltage across the diode to produce a first modulated optical data signal output on the waveguide; and
   a resistive element configured to receive the negative voltage to produce a balance load to the differential driver circuit.

2. An apparatus as in claim 1 wherein the resistive element comprises a second electro-absorption modulator including a first electrode in communication with the bias voltage and a second electrode configured to receive the negative voltage, the first and second electrodes arranged across a second diode including a second waveguide configured to receive the second optical signal and produce a dummy optical output.

3. An apparatus as in claim 2 wherein a resistance of the termination resistor determines a signal swing of the differential driver circuit.

4. An apparatus as in claim 2 further comprising a resistor of resistance R on each of the parallel rails, wherein termination resistor has a termination resistance of 2×R.

5. An apparatus as in claim 2 wherein the dummy optical output is accessible for monitoring.

6. An apparatus as in claim 2 wherein the differential driver circuit is integrated with the first electro-absorption modulator and the second electro-absorption modulator.

7. An apparatus as in claim 2 wherein the optical source comprises an integrated distributed feedback laser diode.

8. An apparatus as in claim 2 wherein the differential driver circuit, the first electro-absorption modulator, and the second electro-absorption modulator are packaged in a multi-chip module.

9. An apparatus as in claim 2 wherein:
the differential driver circuit is in an electrical function block; and
the first electro-absorption modulator and the second electro-absorption modulator are in a photonics block.

10. An apparatus as in claim 8 further comprising a controller and an optical interface platform.

11. A method comprising:
splitting an optical signal from an optical source to provide a first optical input and a second optical input;
providing a differential driver circuit comprising a first parallel rail and a second parallel rail between a high voltage and ground and connected by a termination resistor, the first parallel rail configured to produce a positive voltage and the second parallel rail configured to produce a negative voltage complementary to the first positive voltage;
providing a first electro-absorption modulator comprising,
a first diode comprising a first junction along a first dimension and including a waveguide receiving the first optical signal,
a first electrode in communication with a bias voltage,
a second electrode opposite the waveguide from the first electrode in a second dimension orthogonal to the first dimension;
communicating the positive voltage to the second electrode to apply a voltage across the diode producing a first modulated optical data signal output on the waveguide; and
communicating the negative voltage to a resistive element to provide a balance load to the differential driver circuit.

12. A method as in claim 11 wherein the resistive element comprises a second electro-absorption modulator including a first electrode in communication with the bias voltage and a second electrode configured to receive the negative voltage, the first and second electrodes arranged across a second diode including a second waveguide configured to receive the second optical signal and produce a dummy optical output.

13. A method as in claim 12 wherein a resistance of the termination resistor determines a signal swing of the differential driver circuit.

14. A method as in claim 12 wherein the differential driver circuit further comprises a resistor of resistance R on each of the parallel rails, wherein termination resistor has a termination resistance of 2×R.

15. A method as in claim 12 further comprising monitoring the dummy optical output.

16. A method as in claim 12 wherein the differential driver circuit is integrated with the first electro-absorption modulator and the second electro-absorption modulator.

17. A method as in claim 12 wherein the optical source comprises an integrated distributed feedback laser diode.

18. A method as in claim 12 wherein the differential driver circuit, the first electro-absorption modulator, and the second electro-absorption modulator are packaged in a multi-chip module.

19. A method as in claim 12 wherein the positive voltage is ten volts or less.

20. A method as in claim 12 wherein the first electro-absorption modulator operates with a modulation bandwidth of at least ten gigahertz.

* * * * *